United States Patent [19]

Schneider

[11] Patent Number: 4,686,768
[45] Date of Patent: Aug. 18, 1987

[54] MEASURING CALLIPER

[75] Inventor: Rudolf Schneider, Reinach, Switzerland

[73] Assignee: Erowa AG, Reinach, Switzerland

[21] Appl. No.: 909,618

[22] Filed: Sep. 22, 1986

[30] Foreign Application Priority Data

Mar. 19, 1986 [DE] Fed. Rep. of Germany ....... 3609283

[51] Int. Cl.$^4$ .............................................. G01B 5/02
[52] U.S. Cl. ................... 33/172 B; 33/559; 33/572
[58] Field of Search .................. 33/169 R, 172 B, 501, 33/548, 556, 559, 572

[56] References Cited

U.S. PATENT DOCUMENTS

| | | | |
|---|---|---|---|
| 2,253,803 | 8/1941 | Newberry | 33/172 B |
| 2,352,507 | 6/1944 | Aller et al. | 33/548 |
| 2,547,719 | 4/1951 | Rosser | 33/548 |
| 3,919,780 | 11/1975 | Meyer | 33/172 B |
| 3,946,492 | 3/1976 | DuBose, Jr. | 33/169 R |
| 4,330,942 | 5/1982 | Blechmann | 33/172 B |
| 4,492,035 | 1/1985 | Doninelli | 33/172 B |

FOREIGN PATENT DOCUMENTS 3234470 3/1984 Fed. Rep. of Germany .

Primary Examiner—Richard R. Stearns
Attorney, Agent, or Firm—Tarolli, Sundheim & Covell

[57] ABSTRACT

The measuring calliper provides for the determination of two perpendicular linear dimensions of a workpiece by means of the same measuring apparatus. It comprises a calliper body consisting of two portions which are displaceable with reference to each other. A calliper head, which is engageable with the workpiece to be measured and is operatively coupled to the measuring apparatus, is mounted on a first portion. The second portion is connected to the first portion by means of elastically resilient connection members which extend at an angle of 45° with reference to the measuring directions. Preferably, the calliper body is a one-piece construction and is subdivided into said first and second portions by means of slots provided in the calliper body and extending at an angle of 45°.

7 Claims, 5 Drawing Figures

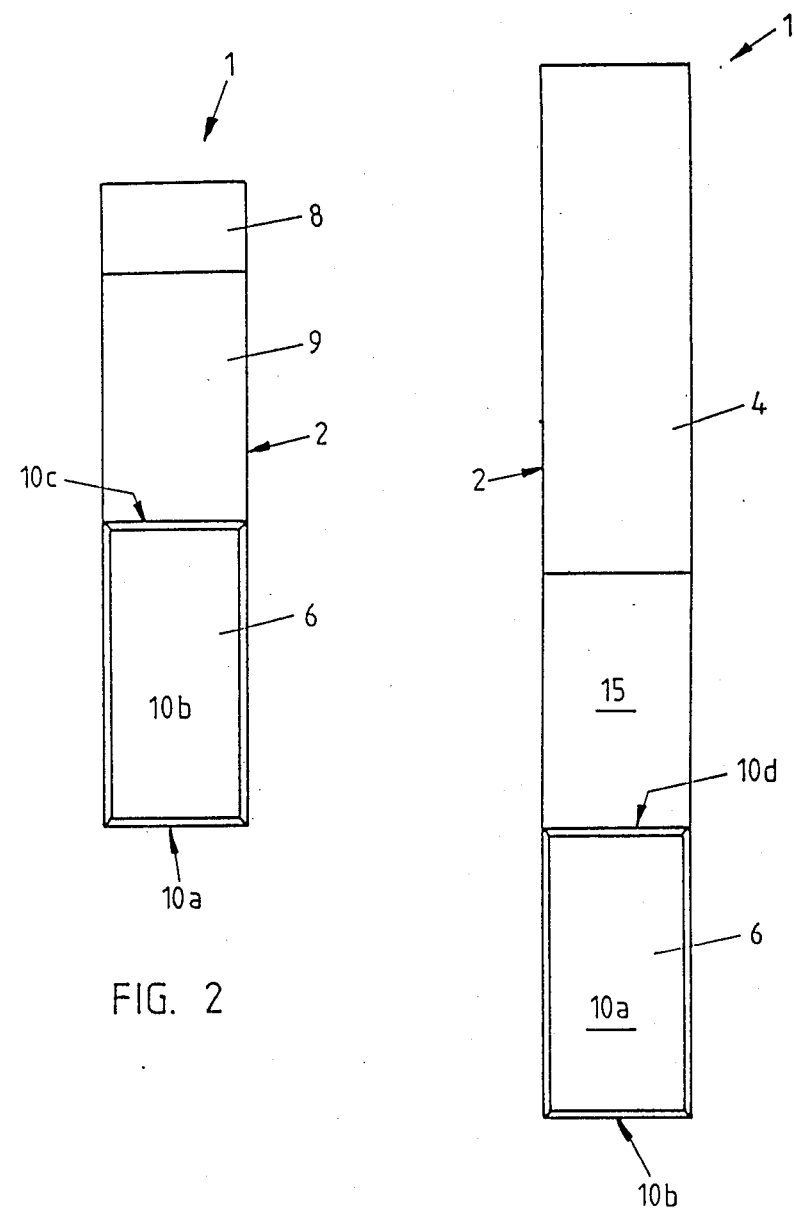

4,686,768

MEASURING CALLIPER

BACKGROUND OF THE INVENTION

1. Field of the Invention

The present invention relates to a measuring calliper for determining the dimensions of a workpiece by means of a measuring apparatus operatively coupled to the measuring calliper, particularly for determining two perpendicularly extending linear dimensions of a workpiece by means of the same measuring apparatus.

To determine linear dimensions in the regions of micrometers or millimeters, measuring apparatus are used which work very precisely within a limited measuring range, e.g. mechanical measuring gauges, electronic path-measuring elements, etc. These instruments have proven highly reliable particularly in determining dimensional variations with reference to a given standard dimension, in determining the concentricity tolerance of rotating workpieces or in determining the position of a workpiece with reference to a given standard position. However, in many cases, the sensor of the measuring apparatus can not be directly operatively coupled to the object to be measured; that is the reason why a measuring calliper is required which establishes the desired coupling between the objects to be measured and the sensor of the measuring apparatus.

2. Prior Art

Already known measuring callipers work unidirectionally linear, i.e. a linear dimension variation in one given direction (and only in this direction) is proportionally transformed into a measurement value shown by the measuring apparatus operatively coupled to the measuring calliper. Therefore, in order to determine the dimension or a dimensional divergence or a variance in dimension of a workpiece in two different directions, either the utilized measuring apparatus including the measuring calliper had to be rearranged and readjusted again, or one had to utilize two measuring set-ups working independently from each other. Such proceeding resulted in an increased expenditure of working hours and/or financial investment.

The German Patent Application DE-OS No. 32 34 470 discloses a way to determine an axial displacement as well as a displacement in a perpendicular plane of a pin sensor by means of one single path-detection element. However, the construction according to that publication needs a very complicated system of levers, bearings, linear ball bearing members and ball-cone-surface arrangements in order to transform the displacement of the pin sensor into a linear displacement of the sensing element within the three coordinates. If this system is to be designed to work with a high degree of precision, a very high expenditure in labour and costs during manufacturing and finishing of the parts thereof has to be afforded. The consequence is that this system will be very expensive and subject to damage.

OBJECTS OF THE INVENTION

It is an object of the present invention to avoid these disadvantages and to provide a measuring calliper having a very simple, thereby inexpensive and rugged construction, by means of which simultaneously two perpendicular linear dimensions can be measured or determined with a single measuring apparatus.

SUMMARY OF THE INVENTION

The invention provides a measuring calliper for determining the dimensions of a workpiece in more than one measuring direction by means of a measuring apparatus operatively coupled to the measuring calliper. The invention is particularly useful for determining two perpendicularly extending linear dimensions of a workpiece by means of the same measuring apparatus. The apparatus of the invention comprises a calliper body member which includes a first portion and a second portion, said first and second portions being displaceable with reference to each other.

A calliper head is mounted on said first portion and said head is adapted to engage the workpiece to be measured. Furthermore, the calliper head is operatively coupled to the measuring apparatus to indicate the amount of the displacement of the first portion with reference to the second portion. The second portion is connected to the first portion by means of two or more parallel, elastically resilient connection members which extend at an angle of 45° with reference to said measuring directions.

Preferably the calliper body member is a one-piece construction and is subdivided into said first and second portions by a plurality of slots provided in the calliper body member. These slots extend at an angle of 45° with reference to the measuring directions. Thereby a first narrow land portion is formed between two parallely extending slots, and a second narrow land portion is formed between an outer edge of said calliper body member, said outer edge extending at an angle of 45° with reference to said measuring directions, and a further slot extending parallely thereto. The two land portions are the elastically resilient connection members.

Of course it is also possible that the two portions of the calliper body member consist of separate elements which are connected to each other by means of two leaf spring elements extending at an angle of 45° with reference to the measuring directions.

Since the required displacement path of the first member with regard to the second member has not to be very long, say less than one millimeter, the relative displacement motion of the first and second portions of the calliper body member is limited to such small movement in order to keep the inaccuracies which might occur low.

In a preferred embodiment, the calliper head consists of a hexaedral body rigidly connected to the first portion of the calliper body member. The hexaedral body comprises at least two freely exposed measuring surfaces enclosing an angle of 90° with reference to each other and further enclosing an angle of 45° with reference to said at least two connection members.

Consequently, an exertion of a measuring force on the measuring calliper in any arbitrary direction will result always either in an always identical or in an exactly opposite linear displacement of the first measuring calliper portion, in two directions which are perpendicular with reference to each other, so that a dimensional variance e.g. in horizontal as well as in vertical direction may be determined by means of a single measuring gauge, the sensor thereof engaging an arbitrary surface of the calliper head, without the need of rearranging the measuring set-up.

BRIEF DESCRIPTION OF THE DRAWINGS

In the following, an embodiment of the object of the invention will be further described by way of example, with reference to the accompanying drawings, in which:

FIG. 2 shows a front view of the measuring calliper of FIG. 1 in the direction of arrow A;

FIG. 3 shows a underside view of the measuring calliper of FIG. 1 in the direction of arrow B;

DESCRIPTION OF A PREFERRED EMBODIMENT

Figure 1:
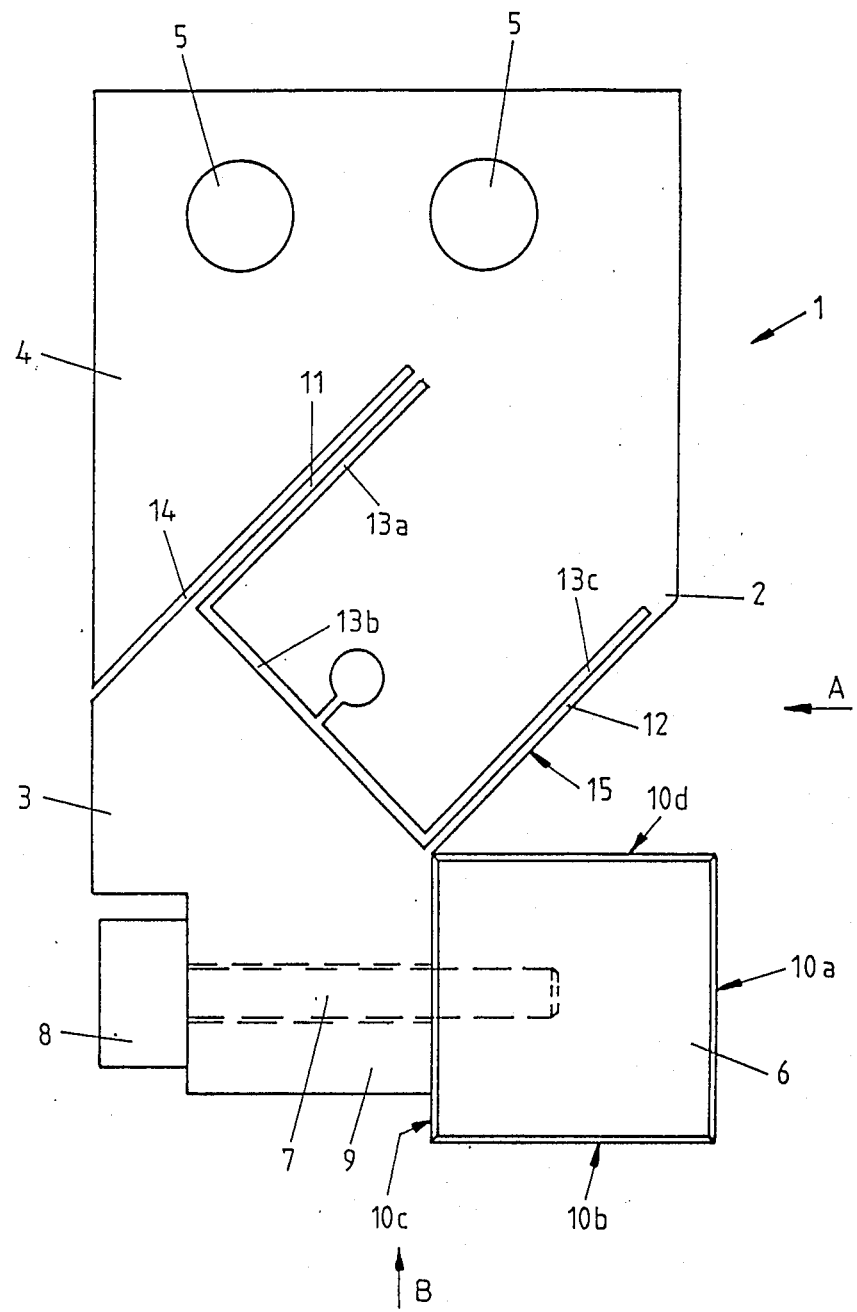
FIG. 1 shows a schematic side view of the measuring calliper in its inoperative position.

The measuring calliper of the present example, generally designated with reference numeral 1, comprises a calliper body 2 which is subdivided into a first portion 3 and a second portion 4. These two portions 3 and 4 are movable or displaceable with reference to each other as will be further explained hereinafter.

The second portion 4 is rigidly mounted or, in a definable and predetermined manner, shiftably and lockably arranged with reference to a workpiece to be measured; for this purpose two fixing openings 5 may be provided to fix the measuring calliper portion 4 on any suitable, if appropriate adjustable, mounting base (not shown) of a measuring apparatus.

The first portion 3 is displaceably connected to the second portion 4 and comprises a calliper head 6 which is, in the present example, rigidly secured to an extension 9 of the first portion 3 of the calliper body 2 by means of a screw 7. The calliper head 6 has the shape of a hexaedral body comprising four measuring surfaces 10a to 10d. These measuring surfaces are plainly machined and extend at an angle of exactly 90° with reference to the two adjacent measuring surfaces. Depending on the real application, at least two adjacent measuring surfaces (e.g. 10a and 10b) are freely exposed; in the present example, additionally, the measuring surface 10c is partially and the measuring surface 10d is almost totally freely exposed as well, i.e. they may be impinged by a measuring force.

The movable coupling between the first portion 3 and the second portion 4 of the calliper body 2 is realized by means of resiliently deformable connection members which extend with reference to the measuring directions, i.e. with reference to the measuring surfaces 10a to 10d, at an angle of 45°. In the present example, two connection members 11 and 12 are provided which form part of the calliper body 2, which itself is made of one piece, i.e. the portions 3 and 4 consist of one and the same body. The subdivision into the two portions 3 and 4 is accomplished by the fact that a plurality of slots 13a to 13c as well as 14 are provided which separate the two portions 3 and 4 from each other.

As can be clearly seen in FIG. 1, the calliper body 2 has a side surface 15 which extends at an angle of 45° with reference to the measuring surfaces 10a to 10d; such arrangement provides for that the measuring surface 10d is freely accessible. Parallely to this side surface 15, this is to say, at an angle of 45° as well, a slot 13c is provided at a small distance from the side surface 15; thereby a first connection member 12 is formed. This first connection member 12 is established by the remaining material land of the calliper body 2 which connects the first portion 3 to the second portion 4.

The slot 13c merges via a perpendicularly arranged slot 13b (which itself extends at an angle of 45° with reference to the measuring surfaces 10a to 10d again) in a slot 13a which is perpendicularly arranged with reference to the last-named slot 13b and which thereby is parallel to the slot 13c, however has a certain distance thereto. Finally, parallely arranged to that slot 13a, in a small distance, a further slot 14 is provided which extends up to the edge of the calliper body 2, so that a material land remains between said slot 14 and the slot 13a which forms the other connection member 11.

Important is, as will be further explained hereinafter, that the lands 11 and 12 serving as connection members extend exactly at an angle of 45° with reference to the measuring surfaces 10a to 10d. On the other hand it is not of paramount importance for the connection members 11 and 12 to be one-piece parts of the calliper body 2; it is also possible, with the same result, to provide the portions 3 and 4 of the calliper body 2 as individually machined, separate parts which are connected to each other by means of two leaf springs (not shown). These have the same function as the material lands 11 and 12 whereby, however, attention must be paid to the fact that the longitudinal extension of the leaf springs is at an angle of 45° with reference to the measuring surfaces 10a to 10d.

If now (according to FIG. 4) a force acts on the measuring surface 10a in the direction of arrow $P_1$, the surface 10a has generally the attempt to linearly displace in the direction of the arrow $P_1$ as well. Since the first portion 3 of the calliper body 2 and thereby the calliper head 6 is pivotally connected to the second portion 4 of the calliper body 2, the calliper head 6 will be forced to move in the direction of the arrow $P_1$ as well as, simultaneously, in the direction of the arrow $P_2$. The reason therefor is that the first movable portion 3 is displaceably connected to the second, immovable portion 4 by means of the two lands 11 and 12 (or, alternatively, by means of the two aforementioned, not shown left springs) which extend at an angle of 45° with reference to the measuring direction. Thereby, a sort of pivoting axes are established at the crossover point of the lands 11 and 12 to the second portion 4, i.e. at the points X and Y (FIG. 4), around which the first portion 3 pivots.

Figure 4:
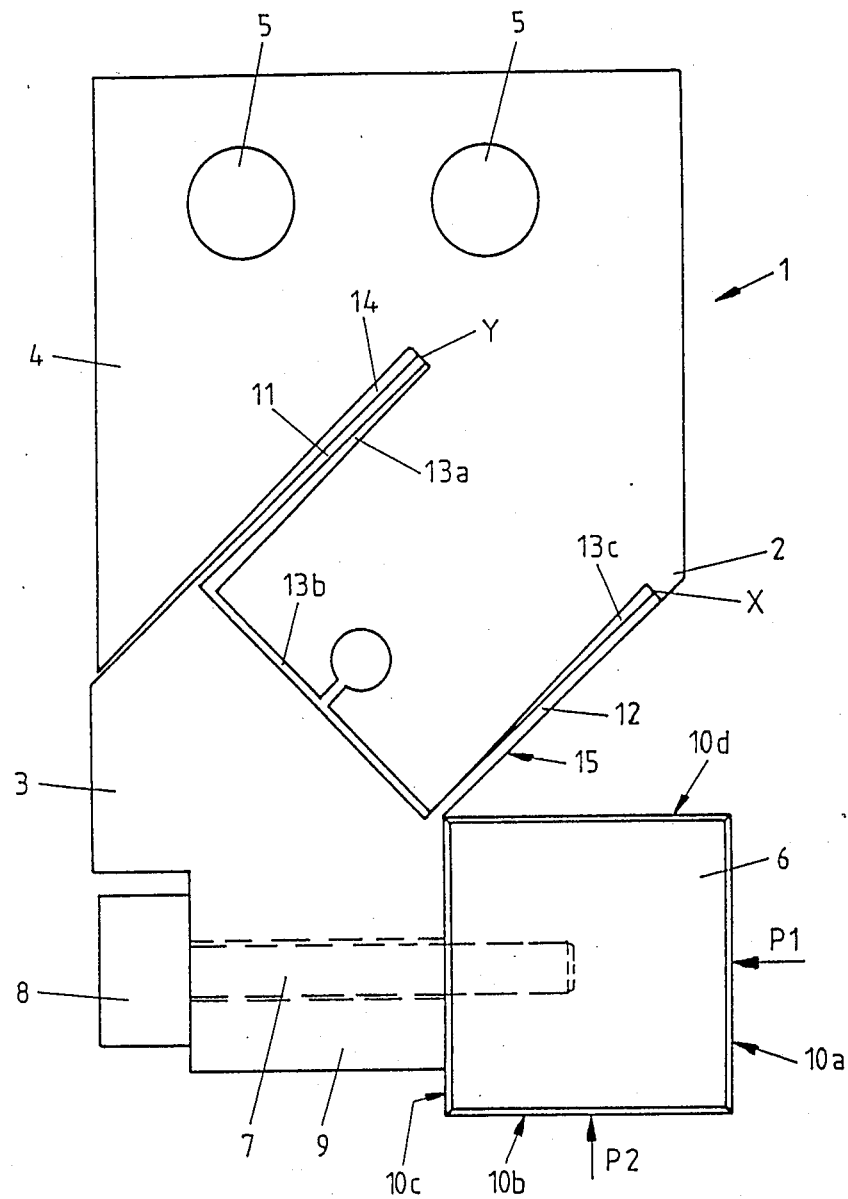
FIG. 4 shwos a schematic side view of the measuring calliper in an operative position, under the influence of a force $P_1$ and $P_2$, respectively, to the calliper head.

In FIG. 4 the maximally possible displacement position of the calliper head 6, under the influence of a force $P_1$, is shown. One can see that the left hand end of the slots 14 and 13c is closed while the left hand end of the slot 13a has fully opened. A stop is provided by the two left hand ends of the lands 11 and 12 abutting against the adjacent calliper body walls which prevent a further displacement of the portion 3.

In practice, the maximal displacement path of the calliper head 6 with reference to the immovable portion 4 of the calliper body 2 is in the region of fractions of a millimeter since a measuring calliper according to the invention usually is utilized in the field of pecision measurements which are related to a reference position rather than for absolute positional measurements. That is the reason why the theoretically present inaccuracy occurring during the deformation of the lands 11 and 12 is of no further importance since the displacement path of the head 6 is very short.

Exactly the same happens if a measuring force acts on the measuring surface 10b in the direction of arrow P₂. Despite the fact that the calliper head 6 theoretically attempts to displace in the direction of the measuring force, it will be forced, as previously explained, to a diagonal motion between the arrows P₁ and P₂. Thereby the object of the invention is met, i.e. utilizing a single measuring apparatus, e.g. a measuring gauge, to determine a displacement of the calliper head 6 in two perpendicular directions (e.g. in the direction of arrow P₁ and in the direction of arrow P₂).

Figure 5:
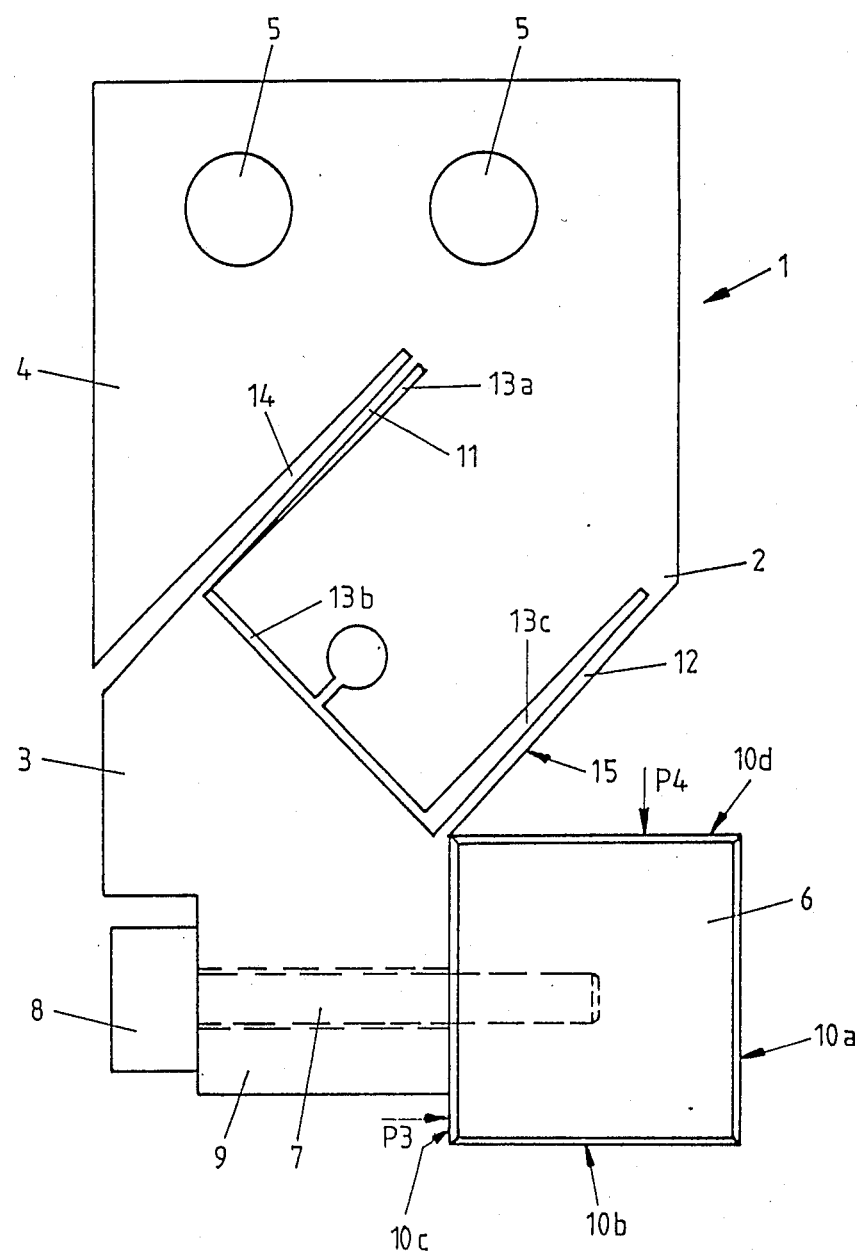
FIG. 5 shows a schematic side view of the measuring calliper in an operative position, under the influence of a force $P_3$ and $P_4$, respectively, to the calliper head.

Kinematically exactly reversed conditions are present if the measuring calliper is impinged with a measuring force in the direction of arrow P₃ and in the direction of arrow P₄, respectively; such a situation is shown in FIG. 5, with maximal deviation of the movable portion 3 with reference to the fixed portion 4 of the calliper body 2 as well. Also in this situation, a force in the direction of arrow P₃ as well as a force in the direction of arrow P₄ will result in an identical displacement of the calliper head 6. The amount thereof can be determined by means of a single measuring apparatus, e.g. a measuring gauge. The only difference is that the displacement occurs in opposite direction as compared to FIG. 4.

The point where the sensor of the measuring apparatus, e.g. the sensor pin of a measuring gauge, contacts the measuring calliper 1 is generally not critical as long as it is an exactly plain surface which extends in an exactly defined angular position with reference to the measuring directions. It is most useful to have the sensor impinge one of the measuring surfaces 10a . . . 10d which is not used for actually contacting an object to be measured since these surfaces in fact do have the required machining precision. Another possibility is to utilize the head 8 of the screw 7 which fixed the calliper head, if the screw head 8 is exactly plainly machined.

With the measuring calliper proposed in this invention, an instrument is provided which allows to monitor two perpendicularly extending measuring directions by means of a single measuring apparatus. It is possible, for example, to determine dimensional variations of a workpiece in horizontal as well as in vertical direction without the need of constructively altering the measuring apparatus set-up. Another important field of application may consist in determining the variation of the shape of a workpiece and the exact determination of the point where such variation occurs by means of a single measuring apparatus, e.g. the transition point of the end-sided, conical portion of a spiral drilling tool into the cylindric part thereof.

What I claim is:

1. A measuring calliper for determining at least two linear dimensions of a workpiece in two respective mutually perpendicular measuring directions by means of measuring apparatus operatively coupled to said measuring calliper, said measuring calliper comprising:
    a calliper body member including first and second portions displaceable with reference to each other;
    a calliper head mounted on said first portion for displacement therewith, said calliper head being operatively coupled to the measuring apparatus and adapted to engage the workpiece; and
    at least two parallel elastically resilient connection members extending at an angle of 45° with reference to said two measuring directions for connecting said first and second portions and enabling relative displacement therebetween, said calliper body member being a one-piece construction having a plurality of slots extending at an angle of 45° with reference to said two measuring directions and defining said first and second portions.

2. A measuring calliper according to claim 1, in which a first one of said at least two connection members is defined by a narrow land portion of said calliper body member located between two of said plurality of slots extending parallel to each other.

3. A measuring calliper according to claim 1, in which a second one of said at least two connection members is defined by a narrow land portions of said calliper body member located between an outer edge of said calliper body member extending at an angle of 45° with reference to said two measuring directions, and a slot extending parallel thereto.

4. A measuring calliper according to claim 1 including means for limiting relative displacement movement of said first and second portions of said calliper body member.

5. A measuring calliper for determining at least two linear dimensions of a workpiece in two respective mutually perpendicular measuring directions by means of measuring apparatus operatively coupled to said measuring calliper, said measuring calliper comprising:
    a calliper body member including first and second portions displaceable with reference to each other;
    a calliper head mounted on said first portion for displacement therewith, said calliper head being operatively coupled to the measuring apparatus and adapted to engage the workpiece; and
    at least two parallel elastically resilient connection members extending at an angle of 45° with reference to said two measuring directions for connecting said first and second portions and enabling relative displacement therebetween;
    said calliper head comprising a hexahedral body rigidly connected to said first portion, said hexahedral body comprising at least two freely exposed measuring surfaces extending at an angle of 90° with reference to each other and forming an angle of 45° with reference to said at least two connection members.

6. A measuring calliper for use with a measuring apparatus for determining at least two linear dimensions of a workpiece in two respective mutually perpendicular measuring directions, said measuring calliper comprising:
    a calliper body member including first and second portions displaceable with reference to each other;
    dimension sensing means mounted on said first portion, said dimension sensing means being operatively coupled to the measuring apparatus and having at least two freely exposed mutually perpendicular surfaces extending in said two measuring directions and engageable with the workpiece; and
    at least two parallel elastically resilient connection members extending at an angle of 45° with reference to said two surfaces for connecting said first and second portions and enabling displacement therebetween.

7. A measuring calliper according to claim 6, in which said first and second portions of said calliper body member are separate elements, and said two connection members are two leaf spring elements.

* * * * *